(12) United States Patent
Iguchi et al.

(10) Patent No.: US 10,321,108 B2
(45) Date of Patent: Jun. 11, 2019

(54) PROJECTOR AND CONTROL METHOD OF PROJECTOR

(71) Applicant: SEIKO EPSON CORPORATION, Tokyo (JP)

(72) Inventors: Tatsuya Iguchi, Matsumoto (JP); Takashi Toyooka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 22 days.

(21) Appl. No.: 15/394,426

(22) Filed: Dec. 29, 2016

(65) Prior Publication Data

US 2017/0208308 A1 Jul. 20, 2017

(30) Foreign Application Priority Data

Jan. 19, 2001 (JP) ................................. 2016-007671

(51) Int. Cl.

| G03B 21/20 | (2006.01) |
|---|---|
| H04N 9/31 | (2006.01) |
| G02B 5/02 | (2006.01) |
| G02B 27/48 | (2006.01) |
| G03B 33/12 | (2006.01) |

(52) U.S. Cl.
CPC ......... *H04N 9/3194* (2013.01); *G02B 5/0278* (2013.01); *G02B 5/0284* (2013.01); *G02B 5/0294* (2013.01); *G02B 27/48* (2013.01); *G03B 21/204* (2013.01); *G03B 21/2053* (2013.01); *G03B 21/2073* (2013.01); *G03B 33/12* (2013.01); *H04N 9/3105* (2013.01); *H04N 9/3158* (2013.01); *H04N 9/3167* (2013.01); *H04N 9/3182* (2013.01); *G02B 5/02* (2013.01)

(58) Field of Classification Search
CPC ............. H04N 9/31; G03B 21/20; G02B 5/02
See application file for complete search history.

(56) References Cited

U.S. PATENT DOCUMENTS

| 2009/0128451 | A1 | 5/2009 | Tokui |
|---|---|---|---|
| 2014/0192331 | A1 | 7/2014 | Toyooka |
| 2015/0153020 | A1* | 6/2015 | Akiyama ........... G03B 21/2073 353/20 |

FOREIGN PATENT DOCUMENTS

| JP | H07-317777 | A | 12/1995 |
|---|---|---|---|
| JP | 2007-298798 | A | 11/2007 |
| JP | 2015-057671 | A | 3/2015 |
| JP | 2015-072387 | A | 4/2015 |
| WO | 2007/023681 | A1 | 3/2007 |
| WO | 2011/148507 | A1 | 12/2011 |

\* cited by examiner

*Primary Examiner* — Cara E Rakowski
*Assistant Examiner* — Danell L Owens
(74) *Attorney, Agent, or Firm* — Oliff PLC

(57) ABSTRACT

A projector which modulates light emitted from a solid light source by an optical modulator and projects an image includes, a division unit which divides first light beams forming the image, a diffusion plate which diffuses one of the first light beams divided by the division unit, a first sensor which receives the light beams diffused by the diffusion plate, a second sensor which receives second light beams having a full width at the half maximum of a spectrum different from the first light beams and forming the image, an adjustment unit which adjusts a ratio of the first light beams to the second light beams according to a detection result of the first sensor and a detection result of the second sensor.

6 Claims, 5 Drawing Sheets

PROJECTOR AND CONTROL METHOD OF PROJECTOR

CROSS-REFERENCE

The entire disclosure of Japanese Patent Application No. 2016-007671, filed Jan. 19, 2016 is expressly incorporated by reference herein.

BACKGROUND

1. Technical Field

The present invention relates to a projector and a control method of the projector.

2. Related Art

In a projector, brightness or white balance of an image to be projected varies according to deterioration of a light source. There is a projector disclosed in, for example, JP-A-2015-72387 as an invention for suppressing variation of brightness and white balance of the image. In the projector, light emitted by a light source is detected by an optical sensor and outputs of a light source generating blue light and a light source generating yellow light are adjusted according to a detection result of the optical sensor to thereby adjust white balance.

In an optical sensor, variations may occur in measurement values by respective sensors even in the same product. An adjustment of an output of a light source is performed according to a measured result by the optical sensor and thus, when variations exist in measurement values of the optical sensor, a problem that the adjustment is accurately performed in a certain projector but the adjustment is not accurately performed in other projectors may occur.

SUMMARY

An advantage of some aspects of the invention is to provide a technology for accurately adjusting a light source even when variations occur in a sensor which performs the measurement of light.

An aspect of the invention provides a projector including a solid light source, a fluorescent substance irradiated with first light beams emitted by the solid light source, a division unit which divides the first light beams emitted by the solid light source, a first optical modulator which modulates one of the first light beams divided by the division unit, a second optical modulator which modulates second light beams separated from light beams emitted by the fluorescent substance and having a wavelength different from the first light beams, a third optical modulator which modulates third light beams separated from light beams emitted by the fluorescent substance and having a wavelength different from the first light beams and the second light beams, a diffusion plate which diffuses the other of the first light beams divided by the division unit, a first sensor which receives the light beams diffused by the diffusion plate, a second sensor which receives the second light beams, and an adjustment unit which adjusts a ratio of the first light beams to be guided to the first optical modulator to the first light beams to be guided to the fluorescent substance according to a detection result of the first sensor and a detection result of the second sensor.

According to the aspect of the invention, it is possible to accurately adjust the light source even when variations occur in a sensor performing the measurement of light.

Another aspect of the invention provides a projector which modulates light emitted from a solid light source by an optical modulator and projects an image, the projector including a division unit which divides first light beams forming the image, a diffusion plate which diffuses one of the first light beams divided by the division unit, a first sensor which receives the light beams diffused by the diffusion plate, a second sensor which receives second light beams having a full width at the half maximum of a spectrum different from the first light beams and forming the image, and an adjustment unit which adjusts a ratio of the first light beams to the second light beams according to a detection result of the first sensor and a detection result of the second sensor.

Also according to this aspect of the invention, it is possible to accurately adjust the light source even when variations occur in a sensor which performs the measurement of light.

The aspect of the invention may be configured such that a diffusion plate which diffuses the second light beams is not provided between an optical member which guides the second light beams to the second sensor and the second sensor.

According to this configuration, it is possible to reduce the number of components constituting the projector.

The aspect of the invention may be configured such that the diffusion plate is provided between the division unit and the first sensor.

According to this configuration, it is possible to smooth spectral sensitivity of the first sensor compared to a configuration in which light is incident on the first sensor from multiple directions and the diffusion plate is not included.

The aspect of the invention may be configured such that a polarization plate is provided between an optical member guiding the first light beams to the first sensor and the diffusion plate.

According to this configuration, it is possible to maintain a correlation between light incident on the optical modulator and light incident on the optical sensor even when a polarization direction of light incident on the optical modulator varies compared to a configuration in which the polarization plate is not provided.

The aspect of invention may be configured such that a first optical modulator which modulates the first light beams and a second optical modulator which modulates the second light beams may also be adopted.

According to this configuration, it is possible to project a color image by the modulated image.

The aspect of the invention may be configured such that a fluorescent substance which emits light beams containing the second light beams by being irradiated with the first light beams emitted by the solid light source is provided, the second light beams contained in the light beams emitted by the fluorescent substance are guided to the second optical modulator, and the adjustment unit adjusts a ratio of the first light beams to be guided to the first optical modulator to the first light beams to be guided to the fluorescent substance.

According to this configuration, it is possible to adjust a ratio of the first light beams to the second light beams in the configuration in which light beams containing the second light beams are generated by the fluorescent substance.

Still another aspect of the invention provides a control method of a projector which includes a solid light source, a fluorescent substance irradiated with first light beams emitted by the solid light source, a division unit dividing the first light beams emitted by the solid light source, a first optical modulator modulating one of the first light beams divided by the division unit, a second optical modulator modulating second light beams separated from light beams emitted by the fluorescent substance and having a wavelength different from the first light beams, a third optical modulator modulating third light beams separated from light beams emitted by the fluorescent substance and having a wavelength different from the first light beams and the second light beams, a diffusion plate diffusing the other of the first light beams divided by the division unit, a first sensor receiving the light beams diffused by the diffusion plate, and a second sensor receiving the second light beams, the control method including adjusting a ratio of the first light beams to be guided to the first optical modulator to the first light beams to be guided to the fluorescent substance according to a detection result of the first sensor and a detection result of the second sensor.

According to this aspect of the invention, it is possible to accurately adjust the light source even when variations occur in a sensor which performs the measurement of light.

Yet another aspect of the invention provides a control method of a projector which modulates light emitted from a solid light source by an optical modulator to project an image and includes a division unit which divides first light beams forming the image, a diffusion plate which diffuses one of the first light beams divided by the division unit, a first sensor which receives the light beams diffused by the diffusion plate, and a second sensor which receives second light beams having a full width at the half maximum of a spectrum different from the first light beams and forming the image, the control method including adjusting a ratio of the first light beams to the second light beams according to a detection result of the first sensor and a detection result of the second sensor.

According to this aspect of the invention, it is possible to accurately adjust the light source even when variations occur in a sensor performing the measurement of light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment
Configuration of Embodiment

Figure 1:
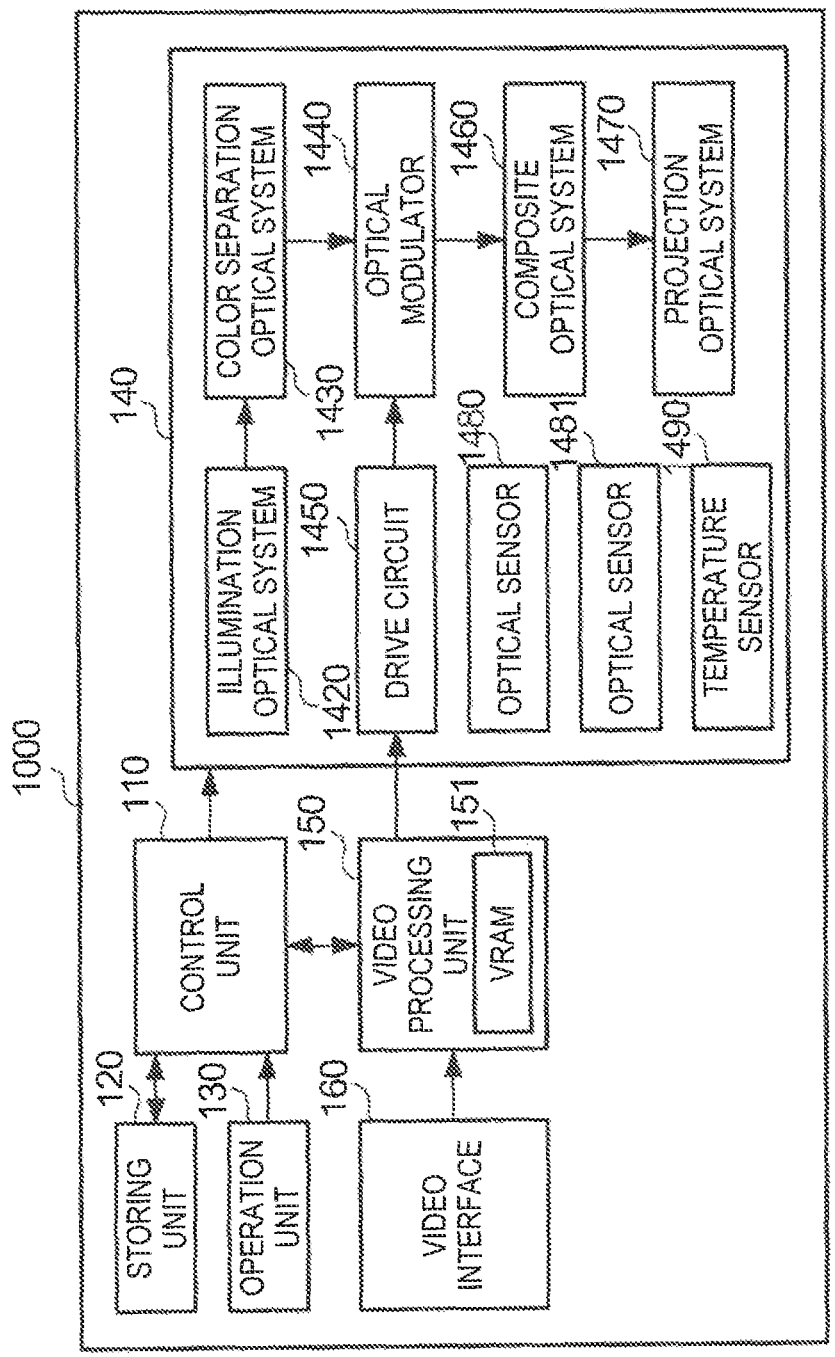
FIG. 1 is a block diagram illustrating a configuration of a projector.

FIG. 1 is a block diagram illustrating a configuration of a projector 1000 according to an embodiment of the invention. The projector 1000, which is an example of a display device, projects an image represented by a video signal supplied from an external device onto a projection surface such as a screen or a wall surface.

The projector 1000 includes a control unit 110, a storing unit 120, an operation unit 130, and a projection unit 140. The projector 1000 includes a video processing unit 150 and a video interface 160. The control unit 110 is a microcomputer provided with a central processing unit (CPU), a read only memory (ROM), and a random access memory (RAM). When the CPU executes a program stored in the ROM, the control unit 110 controls respective units in the projector 1000 such that a function for projecting an image, a function for setting quality of an image to be projected, a function for controlling white balance of an image to be projected and the like are implemented.

The video interface 160 includes a plurality of connectors, such as an RCA, D-Sub, HDMI (registered trademark), and universal serial bus (USB), to which a video signal is supplied and supplies the video signal supplied to the connectors from the external device to the video processing unit 150. The video interface 160 is an example of a video acquisition unit which acquires a plurality of video signals. The video interface 160 may include a wireless communication interface such as a wireless LAN or Bluetooth (registered trademark) and acquire the video signal through wireless communication.

The storing unit 120 stores setting values of image quality of a video to be projected, information of various functions, information to be processed by the control unit 110, or the like. The operation unit 130 includes a plurality of buttons for operating the projector 1000. The control unit 110 controls respective units according to operated buttons to thereby perform an adjustment of an image to be projected onto a screen SCR or setting of various functions equipped in the projector 1000, or the like. The operation unit 130 includes a light receiving unit (not illustrated) that receives an infrared light signal from a remote controller (not illustrated). The operation unit 130 converts a signal transmitted from the remote controller to an electrical signal and supplies the signal to the control unit 110, and the control unit 110 controls respective units according the supplied signal.

The video processing unit 150 acquires the video signal supplied from the video interface 160. The video processing unit 150 acquires a signal of on-screen image, such as a GUI, for operating the projector 1000 from the control unit 110. The video processing unit 150 includes a video RAM (VRAM) 151, a region used for expanding the video signal and a region used for expanding the signal of the on-screen image, and expands respective signal in respective regions. The video processing unit 150 is equipped with various image processing functions, conducts the image processing on the video signal expanded in the VRAM 151, and adjusts quality of the image to be projected. In a case where the signal of the on-screen image is supplied from the control unit 110, the video processing unit 150 supplies a video signal obtained by superimposing the signal of on-screen image to the projection unit 140.

The projection unit 140 projecting an image includes an illumination optical system 1420, a color separation optical system 1430, an optical modulator 1440, a drive circuit 1450, a composite optical system 1460, and a projection optical system 1470. The projection unit 140 includes an optical sensor 1480 (first sensor), an optical sensor 1481 (second sensor), and a temperature sensor 1490.

Figure 2:
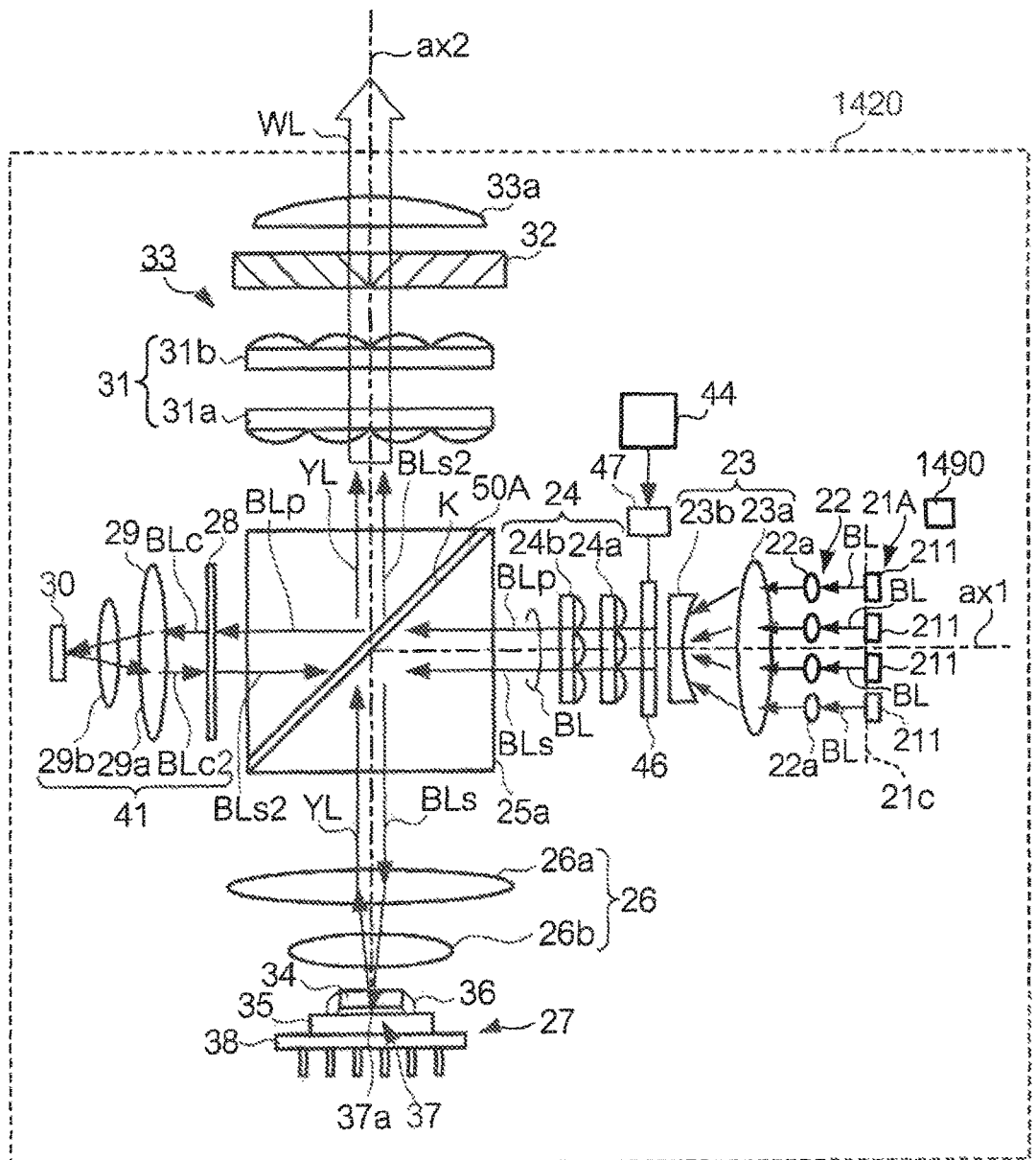
FIG. 2 is a diagram illustrating a configuration of an illumination optical system.
Figure 3:
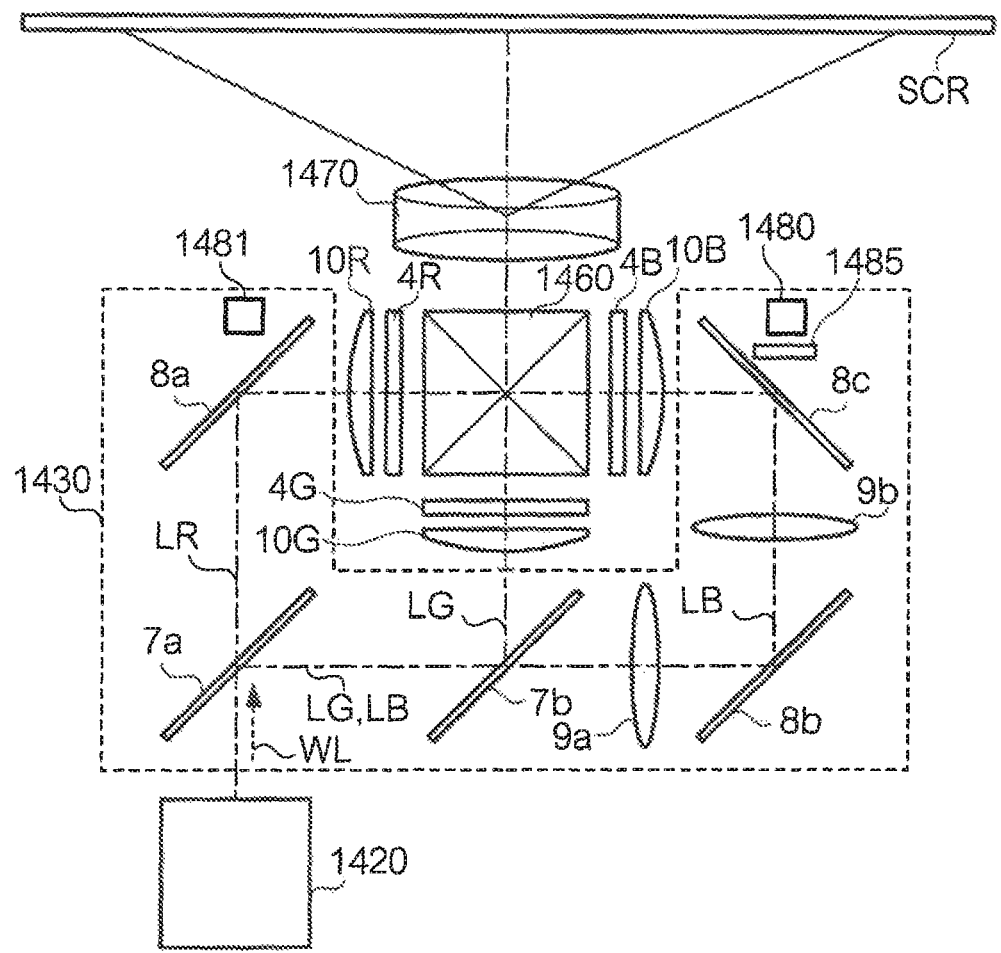
FIG. 3 is a diagram illustrating a configuration of a color separation optical system.

FIG. 2 is a diagram illustrating a configuration of the illumination optical system 1420 and FIG. 3 is a diagram illustrating a configuration of the color separation optical system 1430. As illustrated in FIG. 2, the illumination optical system 1420 includes an array light source 21A, a collimator optical system 22, an afocal optical system 23, a phase difference plate 46, a motor 47, a homogenizer optical system 24, a prism 25A provided with a polarization separation element 50A, a pickup optical system 26, a light emitting element 27, an optical element 41, a polarization conversion element 32, a diffusive reflection element 30, a superimposing optical system 33, and a control device 44.

Among the constitutional elements described above, the array light source 21A, the collimator optical system 22, the afocal optical system 23, the homogenizer optical system 24, the prism 25A, the phase difference plate 28, the second pickup optical system 29, and the diffusive reflection element 30 are sequentially arranged side by side on an optical axis ax1 in a state where respective optical centers thereof coincide with the optical axis ax1 illustrated in FIG. 2. On the other hand, the light emitting element 27, pickup optical system 26, the prism 25A, an integrator optical system 31, the polarization conversion element 32, and a superimposing lens 33a are sequentially arranged side by side on an optical axis ax2 in a state where respective optical centers thereof coincide with the optical axis ax2 illustrated in FIG. 2. The optical axis ax1 and the optical axis ax2 are in the same plane and in a positional relationship in which the optical axes are orthogonal to each other.

The array light source 21A includes a plurality of semiconductor lasers 211. The plurality of semiconductor lasers 211 are arranged side by side in an array in a plane 21c, which is orthogonal to the optical axis ax1. The number of semiconductor lasers 211 is not particularly limited. The semiconductor laser 211 is an example of a solid light source in the invention. The semiconductor laser 211 emits blue light of S polarization. In the present embodiment, a full width at the half maximum of blue light BL emitted by the semiconductor laser 211 is less than or equal to 30 nm. The blue light BL of S polarization is emitted from the array light source 21A toward the collimator optical system 22.

In the present embodiment, the array light source 21A is driven with a constant current or a PWM signal.

Figure 4A:
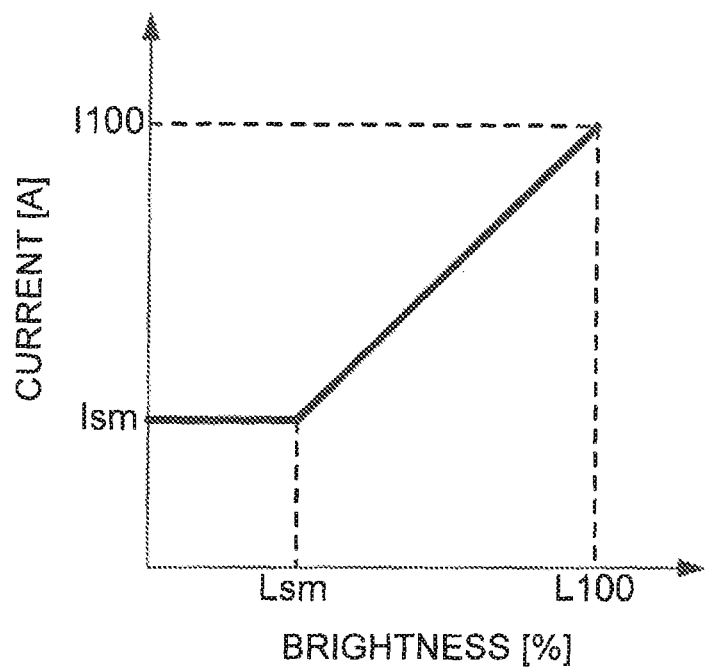
FIGS. 4A and 4B are graphs illustrating an example of a current table and a Duty table.
Figure 4B:
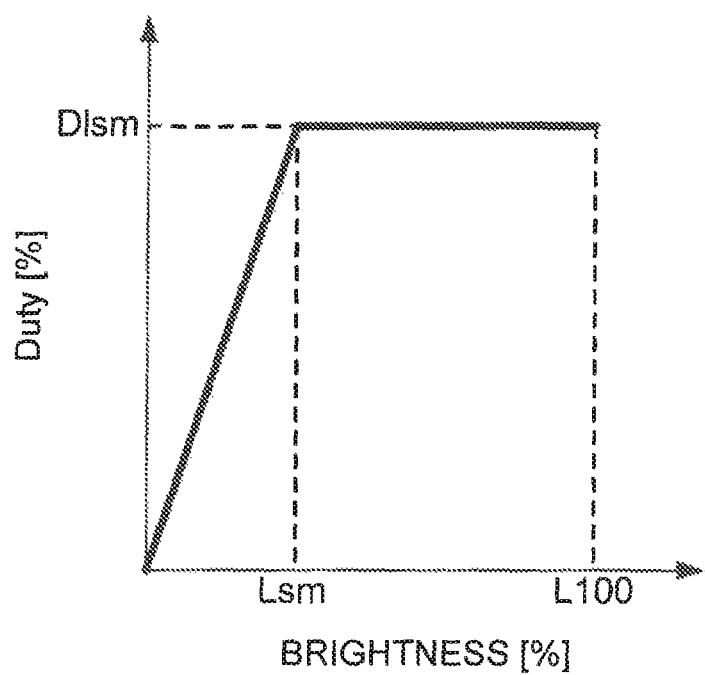

FIGS. 4A and 4B are graphs illustrating an example of a current table and a Duty table when the array light source 21A is driven with the constant current.

The current table of FIG. 4A illustrates a relationship between a drive current and brightness (corresponding to a light quantity) in a case where the array light source 21A is driven with the constant current. The brightness represents a relative brightness (%) to brightness L100 when the array light source 21A is driven with a current I100, in constant current drive mode, which is set in advance at the time of shipment or exchange of the array light source 21A. A current Ism is a current value which is set as a lower limit current with which light is capable of being emitted even when the array light source 21A varies according to temporal deterioration or use environment.

In the current table, the current is increased as brightness is increased in a region in which brightness is greater than or equal to brightness Lsm and the current has the same current value (current Ism) regardless of brightness in a region in which brightness is less than the brightness Lsm. According to the current table, it is possible to derive a current value which varies according to the variation in brightness in the region in which brightness is greater than or equal to brightness Lsm. It is possible to derive the current Ism, regardless of brightness, in the region in which brightness is less than the brightness Lsm.

The Duty table of FIG. 4B illustrates a relationship between brightness and duty (Duty) of a PWM signal in a case where the array light source 21A is driven with the PWM signal. In the Duty table, the array light source 21A is driven with a constant current according to the current table in a region in which brightness is greater than or equal to brightness Lsm and thus, the duty of the PWM signal is 100%. In contrast, the Duty of the PWM signal varies from 0 to 100% as the brightness varies from 0 to Lsm in a region in which brightness is less than the brightness Lsm. According to the Duty table, it is possible to derive duty Dlsm (100%) corresponding to the brightness Lam, regardless of brightness, in the region in which brightness is greater than or equal to brightness Lsm. It is possible to derive duty corresponding to brightness in the region in which brightness is less than the brightness Lsm.

The temperature sensor 1490 is disposed in the vicinity of the semiconductor laser 211. The temperature sensor 1490 measures a temperature of the semiconductor laser 211.

Blue light BL emitted from the array light source 21A is incident on the collimator optical system 22. The collimator optical system 22 converts the blue light BL emitted from the array light source 21A into a parallel light flux. The collimator optical system 22 is constituted with, for example, a plurality of collimator lenses 22a arranged side by side in an array. The plurality of collimator lenses 22a are arranged to be respectively corresponded to the plurality of semiconductor lasers 211.

The blue light BL which is transmitted through the collimator optical system 22 to be converted into the parallel light flux is incident on the afocal optical system 23. The afocal optical system 23 adjusts a light flux diameter of the blue light BL. The afocal optical system 23 is constituted with, for example, an afocal lens 23a and an afocal lens 23b.

The blue light BL which is transmitted through the afocal optical system 23 so that the light flux diameter of blue light BL is adjusted is incident on the homogenizer optical system 24. The homogenizer optical system 24 converts a light intensity distribution of blue light BL into a uniform light intensity distribution called, for example, a top hat type distribution. The homogenizer optical system 24 is constituted with, for example, a multi-lens array 24a and a multi-lens array 24b.

The phase difference plate 46 is provided on an optical path between the afocal optical system 23 and the homogenizer optical system 24, more particularly, between the afocal lens 23b and the multi-lens array 24a. The phase difference plate 46 is rotatably provided in a plane onto which blue light BL is incident. The phase difference plate 46 is constituted with a ½ wavelength plate for a wavelength of blue light BL. The optical axis of the phase difference plate 46 intersects with a polarization axis of blue light BL which is incident on the phase difference plate 46. The optical axis of the phase difference plate 46 may also be any of a phase advance axis or phase delay axis of the phase difference plate 46. The phase difference plate 46 is connected with the motor 47 for rotating the phase difference plate 46. The phase difference plate 46 is rotated by the motor 47.

The blue light BL is coherent S polarization. Although the blue light BL is originally S polarization, the polarization axis of blue light BL intersects with the optical axis of the phase difference plate 46. Therefore, the blue light BL is transmitted through the phase difference plate 46 such that a portion of S polarization is converted into P polarization. As a result, the blue light BL transmitted through the phase difference plate 46 becomes light in which S polarization components BLs and P polarization components BLp coexist at a predetermined rate.

Blue light BL emitted from the homogenizer optical system 24 is incident on the prism 25A. The prism 25A is constituted with, for example, a dichroic prism having wavelength selectivity. The dichroic prism includes a slanted surface K of which an angle to the optical axis ax1 is 45°.

An angle of the slanted surface K to the optical axis ax2 is 45°. The prism 25A is arranged in such a way that the intersecting point of the optical axes ax1 and ax2 orthogonal to each other coincides with the optical center of the slanted surface K. A parallel flat plate type dichroic mirror may be used instead of the prism 25A formed with a dichroic prism.

In the slanted surface K, the polarization separation element 50A having wavelength selectivity is provided. The polarization separation element 50A is equipped with a polarization separation function for separating the blue light BL into the S polarization component BLs and the P polarization component BLp for the polarization separation element 50A. Specifically, the polarization separation element 50A reflects the S polarization component BLs of the blue light BL and transmits the P polarization component BLp of the blue light BL. In the following description, the S polarization component BLs reflected by the polarization separation element 50A is used for excitation of a fluorescent substance layer and thus, is called excitation light BLs. The P polarization component BLp transmitted through the polarization separation element 50A is used as illumination light and thus, is called blue light BLp.

The polarization separation element 50A is equipped with a color separation function for transmitting yellow fluorescent light YL, of which a wavelength band is different from the blue light BL emitted from the semiconductor laser 211, regardless of a polarization state of the yellow fluorescent light YL.

The excitation light BLs of S polarization emitted from the polarization separation element 50A is incident on the pickup optical system 26. The pickup optical system 26 condenses the excitation light BLs toward the fluorescent substance layer 34 of the light emitting element 27. The pickup optical system 26 is constituted with, for example, the pickup lens 26a and the pickup lens 26b.

The excitation light BLs emitted from the pickup optical system 26 is incident on the light emitting element 27. The light emitting element 27 includes the fluorescent substance layer 34, which is an example of a fluorescent substance according to the invention, and a substrate 35 supporting the fluorescent substance layer 34. The excitation light BLs is incident on the fluorescent substance layer 34 such that a fluorescent substance contained in the fluorescent substance layer 34 is excited and yellow fluorescent light YL of which the wavelength is different from the excitation light BLs is generated.

In the light emitting element 27, the fluorescent substance layer 34 is fixed to the substrate 35 by an adhesive 36 provided between the side surface of the fluorescent substance layer 34 and the substrate 35 in a state where a surface located at a side opposite to the side onto which the excitation light BLs is incident contacts the substrate 35. In a surface located at the side opposite to the side in which the fluorescent substance layer 34 of the substrate 35 is provided, a heat sink 38 for dissipating heat of the fluorescent substance layer 34 is provided.

The fluorescent light YL emitted from the fluorescent substance layer 34 is non-polarized light beams of which polarization directions are not aligned and thus, is incident on the polarization separation element 50A in the non-polarization state as it is after being passed through the pickup optical system 26. The fluorescent light YL is transmitted through the polarization separation element 50A and proceeds toward the integrator optical system 31.

On the other hand, the blue light BLp of P polarization emitted from the polarization separation element 50A is incident on the optical element 41. The optical element 41 includes the phase difference plate 28, the second pickup optical system 29, and the diffusive reflection element 30. The blue light BLp is incident on the phase difference plate 28. The phase difference plate 28 is constituted with a ¼ wavelength plate arranged in an optical path between the polarization separation element 50A and the diffusive reflection element 30. Accordingly, the blue light BLp of P polarization emitted from the polarization separation element 50A is incident on the second pickup optical system 29 after being converted into blue light BLc of circular polarization by the phase difference plate 28.

The second pickup optical system 29 condenses the blue light BLc toward the diffusive reflection element 30. The second pickup optical system 29 is constituted with, for example, the pickup lens 29a and the pickup lens 29b.

The diffusive reflection element 30 diffusively reflects the blue light BLc emitted from the second pickup optical system 29 toward the polarization separation element 50A. In particular, it is preferable to use a reflection element reflecting the blue light BLc, which is incident onto the diffusive reflection element 30, according to Lambert's law as the diffusive reflection element 30. In the illumination optical system 1420, such a type of the diffusive reflection element 30 may be used to thereby obtain blue light BLc2 having a uniform illuminance distribution while diffusively reflecting blue light BLc.

As illustrated in FIG. 2, the blue light BLc2 diffusively reflected by the diffusive reflection element 30 is incident on the phase difference plate 28 again such that the blue light BLc2 is converted from the blue light BLc2 of circular polarization to the blue light BLs2 of S polarization. For that reason, the blue light BLs2 of S polarization is emitted from the optical element 41. The blue light BLs2 of S polarization is incident on the polarization separation element 50A. The blue light BLs2 of S polarization is reflected by the polarization separation element 50A and proceeds toward the integrator optical system 31.

As such, the blue light BLs2 and the fluorescent light YL transmitted through the polarization separation element 50A are used as illumination light WL. That is, the blue light BLs2 and the fluorescent light YL are emitted from the polarization separation element 50A toward the same direction with each other. As such, white illumination light WL is obtained by combining the blue light BLs2 and the yellow fluorescent light YL. That is, the polarization separation element 50A also has a function as a color composition element which combines the blue light BLs2 and the fluorescent light YL.

The illumination light WL emitted from the polarization separation element 50A is incident on the integrator optical system 31. The integrator optical system 31 divides the illumination light WL in a plurality of small light fluxes. The integrator optical system 31 is constituted with, for example, the first lens array 31a and the second lens array 31b. The first lens array 31a and the second lens array 31b are formed with a plurality of microlenses being arranged in an array.

The illumination light WL (a plurality of small light fluxes) emitted from the integrator optical system 31 is incident on the polarization conversion element 32. The polarization conversion element 32 is an element for aligning polarization directions of the illumination light WL. The polarization conversion element 32 is constituted with, for example, a polarization separation film, a phase difference plate, and a mirror. The polarization conversion element 32 converts one polarization component into the other polarization component, for example, converts P polarization component into S polarization component in order to align the polarization direction of the fluorescent light YL which is non-polarization and the polarization direction of the blue light BLs2 of S polarization.

The illumination light WL of which the polarization directions are aligned by being passed through the polarization conversion element 32 is incident on a superimposing lens 33a. The superimposing lens 33a superimposes the plurality of small light fluxes emitted from the polarization conversion element 32 on each other on an object to be illuminated. With this, the illumination light WL emitted from the superimposing lens 33a uniformly illuminates the object to be illuminated. The superimposing optical system 33 is constituted with the integrator optical system 31 formed with the first lens array 31a and the second lens array 31b and the superimposing lens 33a.

Next, the color separation optical system 1430 onto which the illumination light WL is incident will be described with reference to FIG. 3. The color separation optical system 1430 separates the illumination light WL emitted from the illumination optical system 1420 into red light LR, green light LG, and blue light LB. The color separation optical system 1430 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a is equipped with a function for separating the illumination light WL emitted from the illumination optical system 1420 into the red light LR, the green light LG, and the blue light LB. The first dichroic mirror 7a transmits the red light LR and reflects the green light LG and the blue light LB. The second dichroic mirror 7b is equipped with a function for separating light reflected by the first dichroic mirror 7a into the green light LG and the blue light LB. The second dichroic mirror 7b reflects the green light LG and transmits the blue light LB.

The first reflection mirror 8a is arranged in an optical path of the red light LR. The first reflection mirror 8a reflects the red light LR transmitted through the first dichroic mirror 7a toward the optical modulator for red light 4R. The second reflection mirror 8b and the third reflection mirror 8c are arranged in an optical path of the blue light LB. The second reflection mirror 8b and the third reflection mirror 8c reflect the blue light LB transmitted through the second dichroic mirror 7b toward the optical modulator for blue light 4B. The green light LG is reflected by the second dichroic mirror 7b and proceeds toward the optical modulator for green light 4G.

The first relay lens 9a and the second relay lens 9b are arranged in a light emission side of the second dichroic mirror 7b in an optical path of the blue light LB. The first relay lens 9a and the second relay lens 9b are equipped with a function for compensating light loss of blue light LB due to a fact that an optical path length of blue light LB is longer than that of the red light LR or green light LG.

The optical modulator for red light 4R (second optical modulator), the optical modulator for green light 4G (second optical modulator), and the optical modulator for blue light 4B (first optical modulator) are included in the optical modulator 1440. The drive circuit 1450 controls the optical modulator for red light 4R, the optical modulator for green light 4G, and the optical modulator for blue light 4B according to the video signal supplied from the video processing unit 150.

The optical modulator for red light 4R modulates the red light LR and forms image light corresponding to the red light LR according to control from the drive circuit 1450. The optical modulator for green light 4G modulates the green light LG and forms image light corresponding to the green light LG according to control from the drive circuit 1450. The optical modulator for blue light 4B modulates the blue light LB and forms image light corresponding to the blue light LB according to control from the drive circuit 1450.

For example, a transmission type liquid crystal panel is used in the optical modulator for red light 4R, the optical modulator for green light 4G, and the optical modulator for blue light 4B. A pair of polarization plates which is not illustrated is arranged in an incident side and an emission side of the liquid crystal panel. The pair of polarization plates transmits linearly polarized light of a specific direction.

A field lens 10R is arranged in the incident side of the optical modulator for red light 4R. The field lens 10G is arranged in the incident side of the optical modulator for green light 4G. A field lens 10B is arranged in the incident side of the optical modulator for blue light 4B. A field lens 10R collimates the red light LR incident on the optical modulator for red light 4R. The field lens 10G collimates the green light LG incident on the optical modulator for green light 4G. The field lens 10B collimates the blue light LB incident on the optical modulator for blue light 4B.

The composite optical system 1460 combines image light beams that respectively correspond to the red light LR, green light LG, and blue light LB and emits the combined image light beam toward the projection optical system 1470. For example, a cross-dichroic prism is used in the composite optical system 1460.

The projection optical system 1470 is constituted with a projection lens group including a plurality of projection lenses. The projection optical system 1470 enlarges and projects the image light beam combined by the composite optical system 1460 toward the screen SCR. With this, an enlarged color image is displayed on the screen SCR.

The optical sensor 1480 is in the vicinity of the third reflection mirror 8c and is disposed at a side opposite to a side onto which the blue light LB is incident in the third reflection mirror 8c. The diffusion plate 1485 which diffuses incident light is provided between the third reflection mirror 8c and the optical sensor 1480. The third reflection mirror 8c transmits a portion of the incident blue light LB and the blue light LB transmitted through the third reflection mirror 8c is incident on the diffusion plate 1485. The third reflection mirror 8c is an example of division unit which divides the blue light LB into light beams incident on the optical modulator 4B for blue light and light beams incident on the optical sensor 1480. The blue light LB which is incident on the diffusion plate 1485 is diffused by the diffusion plate 1485 and is incident on the optical sensor 1480. The optical sensor 1480 detects an intensity of the incident blue light LB.

The optical sensor 1481 is in the vicinity of the first reflection mirror 8a and is disposed at a side opposite to a side onto which the red light LR is incident in the first reflection mirror 8a. The first reflection mirror 8a transmits a portion of the incident red light LR and the red light LR transmitted through the first reflection mirror 8a is incident on the optical sensor 1481. The first reflection mirror 8a is an example of an optical member which guides the red light LR to the optical sensor 1481. The optical sensor 1481 detects an intensity of the incident red light LR.

In the present embodiment, the diffusion plate 1485 is arranged with respect to the optical sensor 1480 and the diffusion plate 1485 is not arranged with respect to the optical sensor 1481. In the following, the reason for this will be described.

Figure 5:
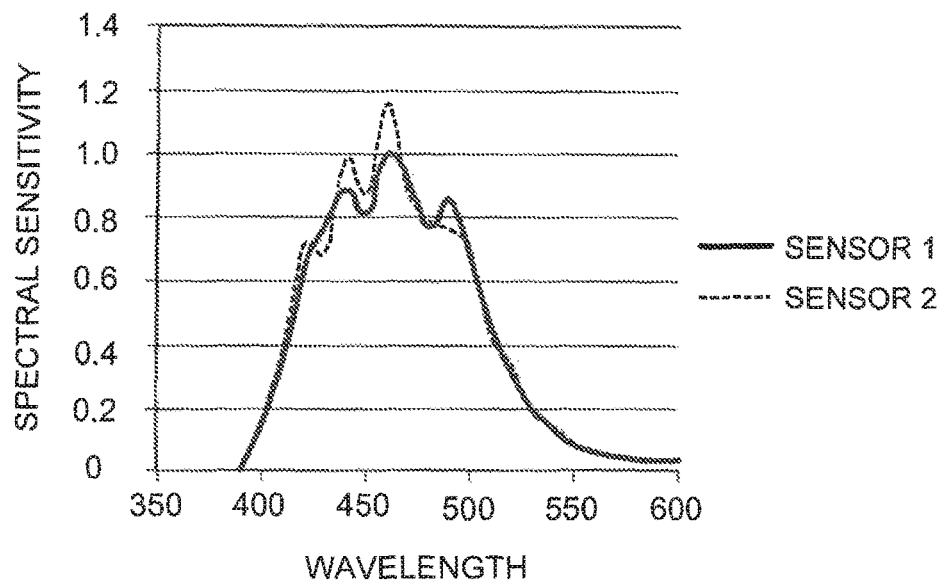
FIG. 5 is a graph illustrating an example of spectral sensitivity of an optical sensor.

FIG. 5 is a graph illustrating an example of spectral sensitivity of the optical sensor 1480 in a case where the diffusion plate 1485 is not included. In FIG. 5, spectral sensitivities of two optical sensors 1480 are represented and one of two optical sensors 1480 is indicated as a sensor 1 and the other one is indicated as a sensor 2. Although the spectral sensitivities of the optical sensor 1480 are different according to angles of light beams which are to be incident, in a case where the diffusion plate 1485 is not included with respect to the optical sensor 1480, an incident angle of blue light LB which is incident on the optical sensor 1480 becomes a specific angle or a narrow angle range and a measurement value is determined by spectral sensitivity of light which is incident at a specific incident angle. Variation is present in spectral sensitivities of the optical sensors 1480 and when the sensor 1 is compared with the sensor 2, as illustrated in FIG. 5, when the wavelength exceeds 450 nm, a difference between spectral sensitivities is present.

The blue light BL of the semiconductor laser 211 is in a narrow band of the spectrum and the spectrum of blue light is shifted due to deterioration or a temperature change of the semiconductor laser 211. For that reason, when an optical spectrum, which is in a narrow band, of the semiconductor laser 211 is shifted, the spectrum of blue light LB incident on the optical sensor 1480 is shifted. Here, as illustrated in FIG. 5, when variation exists in the spectral sensitivity of the optical sensor 1480, for example, in a case where the wavelength of the blue light LB is shifted in the vicinity of 460 nm due to the deterioration or temperature change of the semiconductor laser 211, variations in measured values occur in the projector 1000 provided with the sensor 1 and the projector 1000 provided with the sensor 2.

Figure 6:
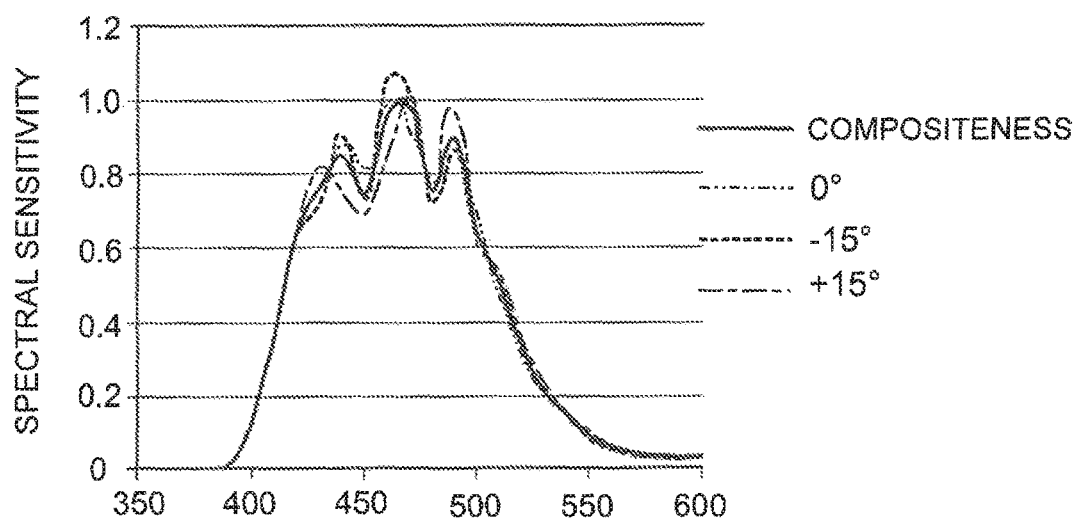
FIG. 6 is a graph illustrating another example of spectral sensitivity of the optical sensor.

Next, FIG. 6 is a graph illustrating an example of spectral sensitivity of the optical sensor 1480 in a case where the diffusion plate 1485 is provided. FIG. 6 illustrates the spectral sensitivity of a single optical sensor 1480 and illustrates characteristics in a case where spectral sensitivities for an angle of 0° of light which is incident on the optical sensor 1480, an incident angle of +15°, an incident angle of −15°, and an incident angle which is in a range of −15°~15° are combined. In a case where the blue light LB diffused by the diffusion plate 1485 is incident on the optical sensor 1480, the measurement values are determined by the spectral sensitivity obtained by combining spectral sensitivities of light beams incident at various angles. The spectral sensitivity obtained by combining spectral sensitivities is smoothed when compared to a case where the blue light LB is incident only from a single direction and thus variation of the measurement values is suppressed even when variation occurs in the spectral sensitivity of the optical sensor 1480. For that reason, the diffusion plate 1485 is arranged with respect to the optical sensor 1480 onto which the blue light LB is incident.

On the other hand, the red light LR obtained by separating the fluorescent light YL excited in the fluorescent substance layer 34 by the first dichroic mirror 7a is incident on the optical sensor 1481. The fluorescent light YL excited in the fluorescent substance layer 34 is in a broadband compared to the blue light LB and thus the red light LR is in the broadband even when the fluorescent light YL is separated into the red light LR and the green light LG by the first dichroic mirror 7a. Furthermore, regarding the fluorescent light YL, since a spectrum shift does not occur unlike the blue light LB, variation does not occur in the measurement values of the optical sensors 1481, and variation of measurement values by a plurality of projectors 1000 does not occur, the diffusion plate 1485 may not be provided with respect to the optical sensor 1481.

Next, operations when the white balance is adjusted will be described. The control unit 110 acquires a detection result of intensity of the blue light LB by the optical sensor 1480 and a detection result of intensity of the red light LR by the optical sensor 1481 at predetermined intervals. The control unit 110 controls the control device 44 such that a ratio of the intensity of the blue light LB to the intensity of the red light LR approaches a predetermined reference value and drives the motor 47 to thereby rotate the phase difference plate 46 and vary an angle of the optical axis of the phase difference plate 46. The control unit 110, the control device 44, and the motor 47 are an example of an adjustment unit for adjusting a rate of light beams arriving at the fluorescent substance layer 34 based on the detection results of the optical sensor 1480 and the optical sensor 1481. The ratio of the blue light LB to the red light LR is varied by adjusting the rate of light beams arriving at the fluorescent substance layer 34 and thus, the control unit 110, the control device 44, and the motor 47 may be regarded as the adjustment unit adjusting the ratio of the blue light LB to the red light LR. The control unit 110, the control device 44, and the motor 47 are an example of an adjustment unit for adjusting a rate of light beams arriving at the fluorescent substance layer 34 based on the detection results of the optical sensor 1480 and the optical sensor 1481.

The reference value of the ratio of the intensity of blue light LB to the intensity of red light LR may be a value determined based on the intensity of blue light LB measured by the optical sensor 1480 at the point of time of starting use of the projector 1000 and the intensity of red light LR measured by the optical sensor 1481 at the point of time of starting use of the projector 1000, and a design value of the projector 1000 may be used as the reference value of the ratio of the intensity of blue light LB to the intensity of red light LR.

When the projector 1000 is continuously used, even when the semiconductor laser 211 is driven under the same condition, the quantity of light emitted from the semiconductor laser 211 is reduced due to temporal change. When the quantity of light emitted from the semiconductor laser 211 is reduced, the light quantity of excitation light BLs which excites the fluorescent substance layer 34 is reduced accompanied by the reduction due to temporal change. Reduction in the light quantity of the excitation light BLs is equivalent to reduction in optical density (light quantity per unit area) of the excitation light BLs. The fluorescent substance generally has a characteristic that if optical density of the excitation light is reduced, conversion efficiency of converting excitation light into fluorescent light is increased. Accordingly, even though the light quantity of the excitation light BLs is decreased, when an increased amount of the fluorescent light by an increase in the conversion efficiency exceeds a decreased amount of the fluorescent light due to the decrease in light quantity of the excitation light BLs, the light quantity of the fluorescent light YL emitted from the fluorescent substance layer 34 is increased. Here, although description is made on a case where the light quantity of the fluorescent light YL is increased by way of an example, the light quantity of the fluorescent light YL may be decreased. However, the white balance is collapsed in any of the cases.

The light quantity of blue light BLs2 and the light quantity of excitation light BLs are also decreased accompanied by the reduction in an output of the semiconductor laser 211. However, the conversion efficiency of the fluorescent substance is increased and thus, the light quantity of the fluorescent light YL with respect to the blue light BLs2 is relatively increased. As a result, the ratio of blue light BLs2 to the yellow fluorescent light YL is varied and, the white balance of illumination light WL which is composite light of the blue light BLs2 and the yellow fluorescent light YL is collapsed compared to the case before temporal change. Specifically, the light quantity of the fluorescent light YL with respect to the blue light BLs2 is relatively increased and thus, the illumination light WL is changed to yellowish white light.

The intensity of blue light LB separated from the illumination light WL of which the white balance is collapsed is measured by the optical sensor 1480 and the intensity of red light LR separated from the illumination light WL of which the white balance is collapsed is measured by the optical sensor 1481. In the storing unit 120, the reference value of the ratio of the intensity of blue light LB to the intensity of red light LR at the point of time of starting use of the projector 1000 is stored in advance. When a predetermined timing arrives, the control unit 110 acquires the intensity of blue light LB detected by the optical sensor 1480 and the intensity of red light LR detected by the optical sensor 1481 and compares the ratio of the acquired intensity with the reference value stored in the storing unit 120. As a result, in a case where a difference between the ratio of the intensity of newly detected blue light LB to the intensity of newly detected red light LR and the stored reference value exceeds a predetermined threshold value, the control unit 110 rotates the phase difference plate 46 such that the ratio of the intensity of blue light LB measured by the optical sensor 1480 to the intensity of red light LR measured by the optical sensor 1481 approaches the reference value (initial value) stored in the storing unit 120.

The phase difference plate 46 is rotated to thereby make it possible to adjust the ratio of the light quantity of S polarization component BLs to the light quantity of P polarization component BLp that are generated by the phase difference plate 46. Specifically, the light quantity of P polarization component BLp may be relatively increased and the light quantity of the S polarization component BLs may be relatively decreased in order to increase the light quantity of P polarization component BLp which becomes blue light and decrease the light quantity of the S polarization component BLs which becomes the excitation light generating the fluorescent light YL. With this, the light quantity of P polarization component BLp which becomes blue light transmitted through the polarization separation element 50A is relatively increased compared to when the white balance of illumination light WL is collapsed, and thus, the illumination light WL becomes light nearer to white and the white balance is able to be improved.

Modification Example

As such, although the embodiment of the invention is described, the invention is not limited to the embodiments described above and other various modifications can be embodied. For example, the embodiments described above may also be modified like the following description so as to embody the invention. The respective embodiments described above and the following modification example may be embodied by combining a single or a plurality of embodiments and the modification example.

In the embodiments described above, although the optical modulator for red light 4R, the optical modulator for green light 4G, and the optical modulator for blue light 4B are liquid crystal panels and the polarization directions of light beams incident on the liquid crystal panel are aligned in a predetermined direction, the polarization direction may be changed due to the temperature change or the like. When the polarization directions of light beams incident on the liquid crystal panel are changed, light linearly polarized in a specific 10.5 direction is not transmitted by a polarization plate in the liquid crystal panel and thus, an image to be projected is influenced by the polarization direction of light incident on the liquid crystal panel. In a case of the configuration of the embodiment described above, the optical sensor 1480 measures the intensity without being influenced by the polarization direction of blue light LB and thus the measurement result is not influenced by the polarization direction of blue light LB. As a result, in a case of the configuration of the embodiment described above, the correlation of light transmitted through the liquid crystal panel and contributing to an image to be projected and light measured by the optical sensor 1480 is changed and the white balance of image to be projected is unable to be nearer to white balance of the reference.

In the invention, the polarization plate may be arranged between the third reflection mirror 8c and the diffusion plate 1485 and the blue light LB transmitted through the polarization plate may incident on the diffusion plate 1485. The polarization plate is arranged such that linearly polarized light of which direction is the same as linearly polarized light, which is transmitted by the polarization plate which is arranged with respect to the optical modulator for blue light 4B, is transmitted through the polarization plate. A polarization plate may be arranged between the first reflection mirror 8a and the optical sensor 1481 such that linearly polarized light of which direction is the same as linearly polarized light, which is transmitted by the polarization plate which is arranged with respect to the optical modulator for red light 4R, is transmitted through the polarization plate. According to the present modification example, even when the polarization direction of blue light LB is changed due to temperature change or the like, it is possible to make the white balance of the image to be projected nearer to white balance of the reference without changing the correlation of light transmitted through the liquid crystal panel and contributing to an image to be projected and light measured by the optical sensor 1480.

In the embodiments described above, although the blue light BLs2 and the fluorescent light YL are generated from a single array light source 21A, a configuration in which two array light sources 21A of an array light source 21A causing the fluorescent substance layer 34 to be irradiated with light and another array light source 21A generating the blue light BLs2 are provided may also be adopted.

In the invention, in a replacement of the configuration in which the fluorescent light YL is generated in the fluorescent substance layer, a configuration in which a light source emitting red light and a light source emitting green light are provided may also be adopted.

In the embodiments described above, although the semiconductor laser 211 is adopted as a solid light source emitting the blue light BL, a light emitting diode (LED) which is an example of the solid light source may be adopted in the replacement of the semiconductor laser.

In the invention, whether the diffusion plate 1485 is provided with respect to the optical sensor 1480 or the optical sensor 1481 or not may also be determined according to a full width at the half maximum of light incident on each optical sensor. For example, regarding the optical sensor for which the full width at the half maximum of the light to be incident is less than or equal to 30 nm, light diffused by the diffusion plate 1485 may be allowed to be incident on the optical sensor and regarding the optical sensor for which the full width at the half maximum of the light to be incident is greater than 30 nm, light to be incident on the optical sensor may not be allowed to be diffused by the diffusion plate 1485.

In the embodiments described above, although the projector 1000 is configured to include the plurality of optical modulators, a configuration in which the number of the optical modulator is one and a color image is projected by switching light incident on the optical modulator may also be adopted.

What is claimed is:

1. A projector which modulates light emitted from a solid light source by a first optical modulator and projects an image, the projector comprising:
   a division unit which divides first light beams forming the image;
   a diffusion plate which diffuses one of the first light beams divided by the division unit, such that the first light beams incident on the division unit proceed to either the diffusion plate or the first optical modulator, wherein the first optical modulator modulates one of the first light beams divided by the division unit;
   a first sensor which receives the light beams diffused by the diffusion plate;
   a second sensor which receives a second light beams having a full width at the half maximum of a spectrum different from the first light beams and forming the image; and
   an adjustment unit which adjusts a ratio of the first light beams to the second light beams according to a detection result of the first sensor and a detection result of the second sensor, wherein:
   a diffusion plate which diffuses the second light beams is not included between (I) an optical member which guides the second light beams to the second sensor and (II) the second sensor.

2. The projector according to claim 1,
   wherein the diffusion plate which diffuses one of the first light beams divided by the division unit is included between the division unit and the first sensor.

3. The projector according to claim 1, further comprising:
   a polarization plate included between an optical member guiding the first light beams to the first sensor and the diffusion plate.

4. The projector according to claim 1, further comprising:
   a second optical modulator which modulates the second light beams.

5. The projector according to claim 4, further comprising:
   a fluorescent substance which emits light beams containing the second light beams by being irradiated with the first light beam emitted by the solid light source, wherein:
   the second light beams contained in the light beams emitted by the fluorescent substance are guided to the second optical modulator; and
   the adjustment unit adjusts a ratio of the first light beams to be guided to the first optical modulator to the first light beams to be guided to the fluorescent substance.

6. A control method of a projector which modulates light emitted from a solid light source by a first optical modulator, projects an image and includes a division unit which divides first light beams forming the image, a diffusion plate which diffuses one of the first light beams divided by the division unit, such that the first light beams incident on the division unit proceed to either the diffusion plate or the first optical modulator, the first optical modulator modulating one of the first light beams divided by the division unit, a first sensor which receives the light beams diffused by the diffusion plate, and a second sensor which receives a second light beams having a full width at the half maximum of a spectrum different from the first light beams and forming the image, wherein a diffusion plate which diffuses the second light beams is not included between an optical member which guides the second light beams to the second sensor and the second sensor, the control method comprising:
   adjusting a ratio of the first light beams to the second light beams according to a detection result of the first sensor and a detection result of the second sensor.

* * * * *

UNITED STATES PATENT AND TRADEMARK OFFICE
CERTIFICATE OF CORRECTION

PATENT NO. : 10,321,108 B2
APPLICATION NO. : 15/394426
DATED : June 11, 2019
INVENTOR(S) : Tatsuya Iguchi et al.

Page 1 of 1

It is certified that error appears in the above-identified patent and that said Letters Patent is hereby corrected as shown below:

On the Title Page

Please change Item (30), Column 1, Line 1, under Foreign Application Priority Data from "Jan. 19, 2001" to --Jan. 19, 2016--

Signed and Sealed this
Twentieth Day of August, 2019

Andrei Iancu
*Director of the United States Patent and Trademark Office*